United States Patent
Lee (10) Patent No.: US 7,624,247 B2
(45) Date of Patent: Nov. 24, 2009

(54) METHOD AND APPARATUS FOR EXECUTING DYNAMIC MEMORY MANAGEMENT WITH OBJECT-ORIENTED PROGRAM

(75) Inventor: Woo-Hyong Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/980,447

(22) Filed: Oct. 31, 2007

(65) Prior Publication Data

US 2008/0065841 A1   Mar. 13, 2008

Related U.S. Application Data

(63) Continuation of application No. 10/674,277, filed on Sep. 30, 2003, now Pat. No. 7,325,118.

(51) Int. Cl.
*G06F 12/06* (2006.01)
(52) U.S. Cl. .................................... 711/170; 707/205
(58) Field of Classification Search ................ 711/170, 711/171, 172, 154, 152, 158; 707/205, 221, 707/201; 710/22
See application file for complete search history.

(56) References Cited

U.S. PATENT DOCUMENTS

| | | | |
|---|---|---|---|
| 5,287,521 A | 2/1994 | Nitta et al. | |
| 5,784,698 A | 7/1998 | Brady et al. | |
| 5,784,699 A | 7/1998 | McMahon et al. | |
| 6,249,852 B1 * | 6/2001 | Benayon et al. | 711/170 |
| 6,308,320 B1 | 10/2001 | Burch | |
| 6,324,631 B1 | 11/2001 | Kuiper | |
| 6,647,479 B1 | 11/2003 | Laws | |
| 6,701,420 B1 * | 3/2004 | Hamilton et al. | 711/170 |
| 6,874,004 B2 | 3/2005 | Jolly | |
| 2002/0016896 A1 | 2/2002 | Siebert | |
| 2003/0028739 A1 | 2/2003 | Li et al. | |

FOREIGN PATENT DOCUMENTS

| | | |
|---|---|---|
| CN | 1393780 | 1/2003 |
| GB | 2363870 | 1/2002 |

OTHER PUBLICATIONS

British Examination Report dated Sep. 30, 2008.
British Office Action dated Nov. 30, 2005, for British Application No. GB0421134 1.9.
Dimpsey, R., Java Server Performance: A Case Study of Building Efficient, Scalable JVMS, (2000), IBM Systems Journal, vol. 39, No. 1, pp. 151-174.

(Continued)

*Primary Examiner*—Pierre-Michel Bataille
(74) *Attorney, Agent, or Firm*—Harness, Dickey & Pierce, PLC (57) ABSTRACT

The disclosure is a method and apparatus for operating dynamic memory management with an object-oriented program, by which objects with frequent creation and short life spans are allocated to a unit memory block in sequence. After released from the unit memory block, the objects are added on a free re-use list so as to be reused when there is an invocation of allocation for the same object size. It is advantageous to enhancing system performance.

4 Claims, 6 Drawing Sheets

OTHER PUBLICATIONS

British Patent Office Action dated Dec. 4, 2006, for corresponding British Patent Application No. GB0421341.9.
British Patent Office Action dated Jun. 1, 2006, for corresponding British Patent Application No. GB0421341.9.
British Patent Office Action dated Jul. 12, 2007, for corresponding British Patent Application No. GB0421341.9.
IBM Technical Disclosure Bulletin, "Method of Managing Main Storage Areas that are Shared . . . ", vol. 37, No. 1, Jan. 1, 1994, p. 231.
Programming Project—'Safe Storage Allocation'—Jonathan Amsterdam-Oct. 1986 (pp. 123-132).
Great Britain Search and Examination Report dated May 23, 2008.

* cited by examiner

Fig. 1

(PRIOR ART)

METHOD AND APPARATUS FOR EXECUTING DYNAMIC MEMORY MANAGEMENT WITH OBJECT-ORIENTED PROGRAM

CROSS-REFERENCE TO RELATED APPLICATIONS

This is a continuation application, and claims priority under 35 U.S.C. § 120 to, U.S. application Ser. No. 10/674,277, filed Sep. 30, 2003, now U.S. Pat. No. 7,325,118 the entire disclosure of which is incorporated herein by reference in its entirety.

FIELD OF THE INVENTION

The present invention is generally directed to object-oriented software systems and more specifically, to dynamic memory managements for object allocations in the systems.

BACKGROUND OF THE INVENTION

Object-oriented programs (OOPs) have been regarded to be on the merits over typical procedural programs, which include code reuses from succession, the accomplishment of data abstraction, the factuality of poly-configuration for data, the facilities of overloading operators. Those prolific performances of the OOPs are being more advanced continuously. Meanwhile, from a growing number of studies, a dynamic memory management (DMM) is now considered as a significant component in operation of a software system, consuming up 30% of the program execution time therein. Therefore, the importance for the dynamic memory management becomes heavier and the higher efficiency of conducting the DMM needs to improve a program operation speed in the system.

Figure 1:
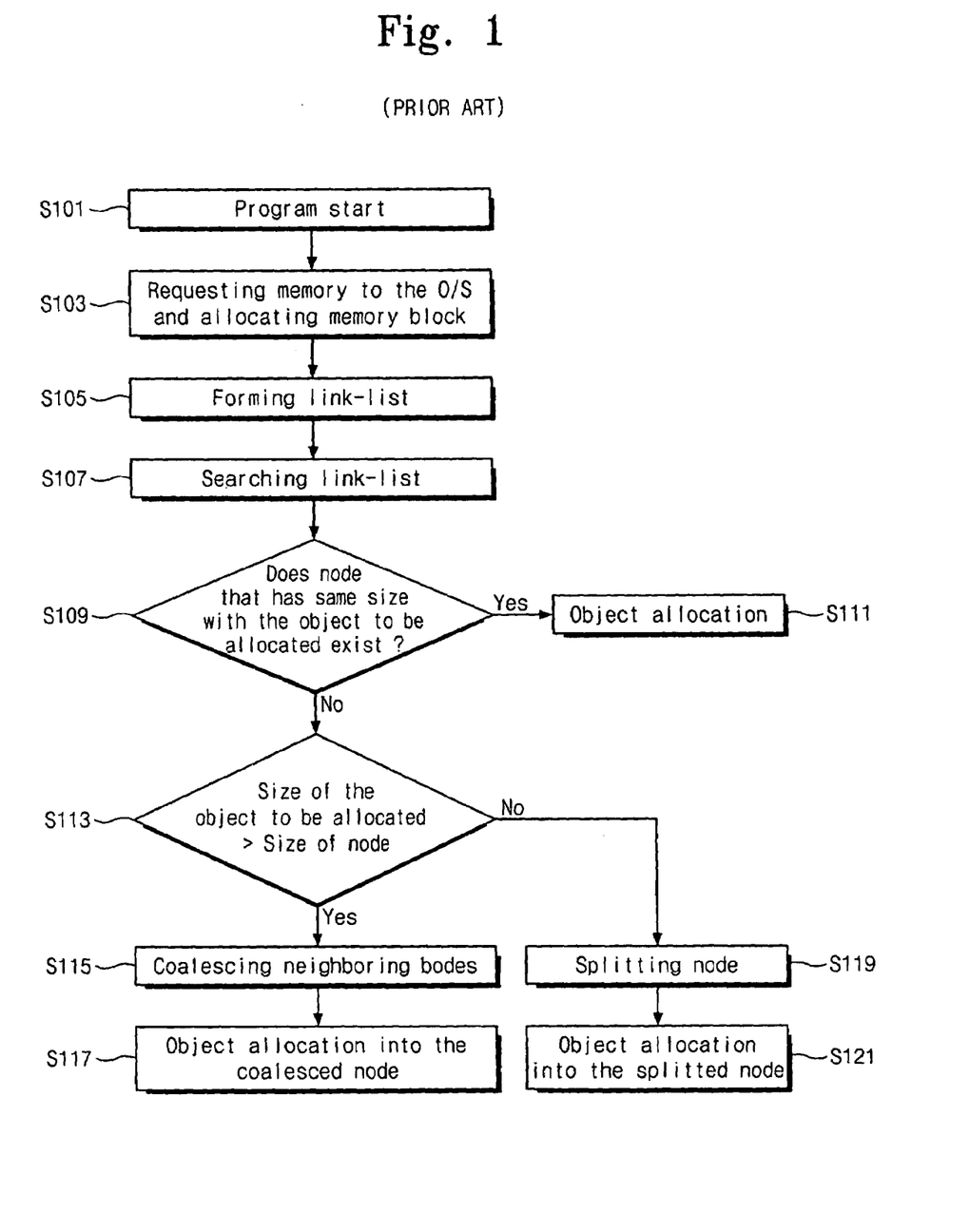
FIG. 1 is a flow chart showing a conventional procedure of memory allocation for objects.
Figure 2:
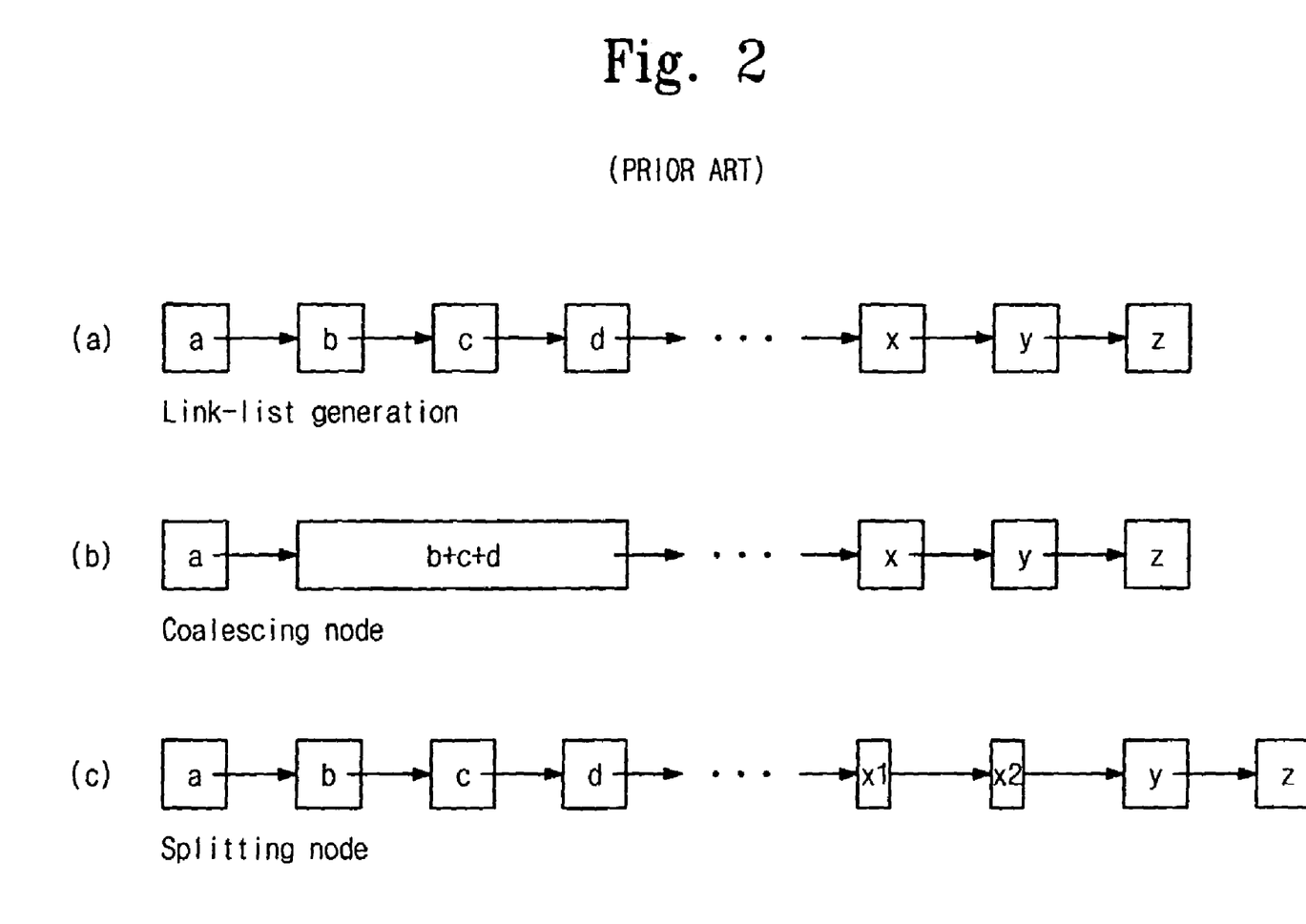
FIG. 2 illustrates a sequence for memory allocation shown in FIG. 1.

It has been usual to carry out a DMM in the way of memory allocation regardless of object sizes, as shown in FIGS. 1 and 2. Referring to FIG. 1, if there is a request for memory by way of an operation system (OS) in a step S103, e.g. an invocation of a function sbrk( ) by a memory management (or allocation) function malloc( ), the memory is assigned to a heap. Then, in step S105, a free link list is generated by a memory management unit to allocate objects to the memory that is segmented into partitions in adequate sizes (refer to process A of FIG. 2).

If there is a request for object allocation, it scans the free link list at step S107 to find a node having the same size with the object requested for allocation. In step S109, it determines there is the node of the same size of the requested object. If the free link list has the node with the same size of the requested object, the node is released from the free link list and then put into the object allocation process in step S111. On the other hand, if there is no one accordant with the requested object in size in the free link list, it determines whether the size of the requested object is larger than nodes of the free link list at step S113. If the requested object is larger than the nodes of the free link list, the nodes of the free link list are coalesced into a single node at step S115 (refer to process B of FIG. 2) and the coalesced node is released from the free link list to be used in allocating the object at step S117. To the contrary, if the requested object is smaller than the nodes of the free link list, the nodes are split into smaller nodes in step S119 (refer to process C of FIG. 2) and the split nodes are released from the free link list to be used in allocating the object at step S121.

By the way, if an allocated object is deleted, a node allocated to the object is inserted into the free link list for reuse. While this, too large node to be inserted into the free link list may be split into further smaller node adequate to be inserted thereinto.

However, the conventional manner of DMM consumes up a considerable execution time in operation because it basically needs terms of scanning the free link list, and coalescing and splitting the nodes composing the free link list. Sometimes, it would occur with the worst case that the free link list should be quested in full.

Moreover, the function malloc( ) is forced to be invoked, as well as conducting the scanning for the free link list and the coalescing and splitting of the nodes, whenever there is a request for the object allocation.

SUMMARY OF THE INVENTION

The present invention is directed to a method and apparatus for executing a dynamic memory management with improved performance.

The present invention is also directed to a method and apparatus for executing a dynamic memory management in an efficiently shorter operation time.

According to an aspect of the present invention, a method for a dynamic memory management with an object oriented program is conducted with including the steps of forming a free link list for an object allocation, allocating a large object over a predetermined threshold to a node which is made by coalescing a plurality of nodes to be same as a size of the large object with reference to the free link list, sequentially allocating a small object, which is less than or the same with the threshold, to a memory block having a storage capacity larger than the threshold, allocating, when there is a reusable object corresponding to the object in a free reuse list, the object to a specific field of the memory block assigned to the reusable object.

The memory block is associated with a data structure including information for the allocated object, an address pointer indicating an address to which the allocated object is assigned, and a released object pointer indicating an object released from the memory block. The free reuse list is formed by an arrangement including elements of null pointers with reference to the threshold. One of the null pointers which corresponds to the released object indicates the released object.

The null pointer indicates a current one of the released object, the released object pointer assigned to the currently released object indicates a previous one of the released object.

The size of the threshold is established by analyzing objects frequently created and extinct in the object oriented program.

The present invention will be better understood from the following detailed description of the exemplary embodiment thereof taken in conjunction with the accompanying drawings, and its scope will be pointed out in the appended claims.

BRIEF DESCRIPTION OF THE DRAWINGS

A more complete understanding of the present invention may be had by reference to the following description when taken in conjunction with the accompanying drawings in which.

DESCRIPTION OF THE PREFERRED EMBODIMENT

It should be understood that the description of the preferred embodiment is merely illustrative and that it should not be taken in a limiting sense. In the following detailed description, several specific details are set forth in order to provide a thorough understanding of the present invention. It will be obvious, however, to one skilled in the art that the present invention may be practiced without these specific details.

Now, practical embodiments of the invention will be explained in conjunction with the drawings.

[Data Structure]

Figure 3:
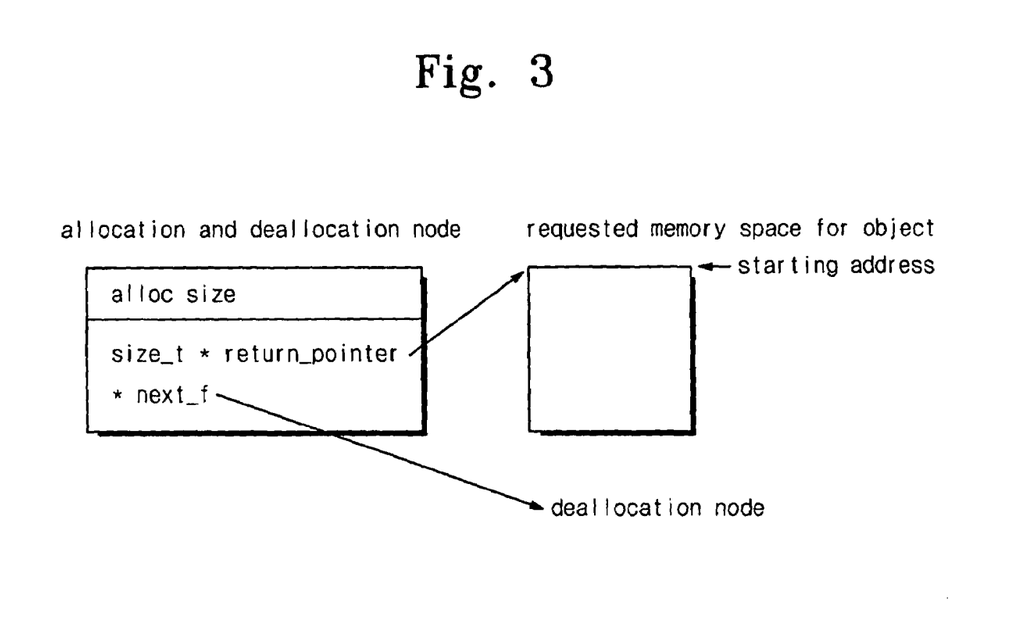
FIG. 3 is an illustration of a data structure for object allocation and reuse according to the present invention.

FIG. 3 illustrates a data structure for object allocation and reuse in an object-oriented system. The data structure for abject allocation and reuse includes fields for an object size (alloc_size), an address pointer (*return_pointer), and a release object pointer (*next_f). The alloc_size indicates a size of an object to be allocated. The *return_pointer indicates a memory block address to be assigned with the object. The *next_f denotes an object to be released from the memory block.

[Object Allocation]

Figure 4:
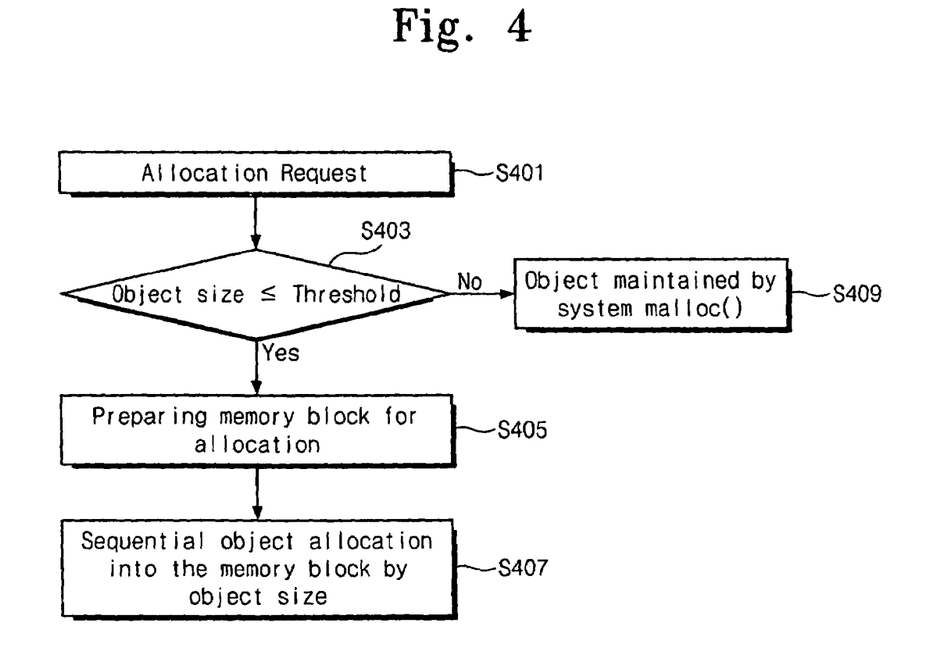
FIG. 4 is a flow chart illustrating a procedure of object allocation procedure according to the present invention.
Figure 5:
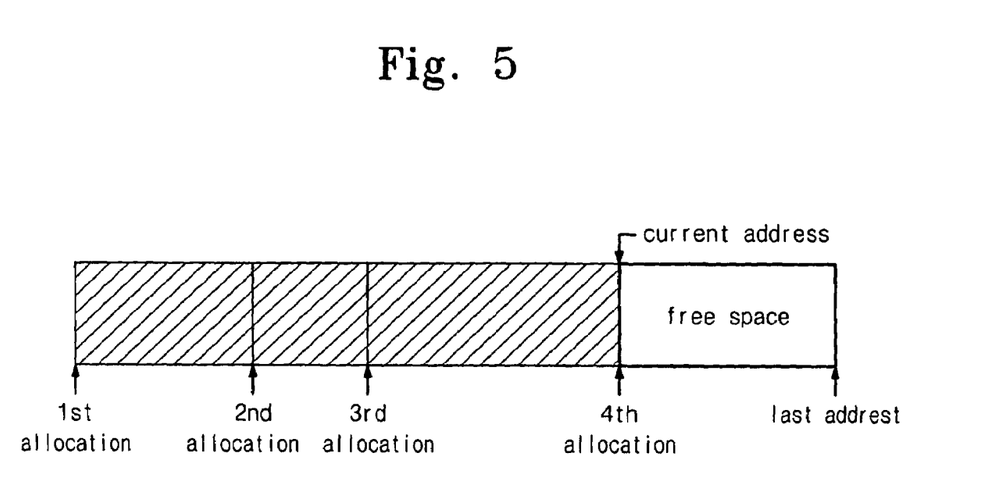
FIG. 5 is an illustration of object allocation according to the invention.

FIGS. 4 and 5 illustrate the process and feature of allocating objects in the present object-oriented system. Referring to FIG. 4, if there is a request for an object allocation in step S401, it determines a size of the requested object is smaller than a predetermined threshold or the same therewith at step S403. The threshold can be obtained from an analysis for object allocation patterns virtually coming out from an object-oriented program (OOP). For instance, from the analysis with OOPs such as C++ programs, it is noticed that objects almost over 90% are reused therein with very small sizes not over 512 bytes at most. Therefore, it may be reasonable to establish the threshold on 512 bytes for the object size.

If the requested object size is smaller than the threshold or the same, a memory block of a predetermined storage capacity is provided to allocate the requested object in step S405. The memory block may be available from the free link list formed by the memory management function malloc( ). The size of the memory block may be larger than the threshold, e.g. 8 Kbytes.

In step S407, the objects smaller than the threshold are allocated into the memory block in sequence as shown in FIG. 5, occupying the memory block in accordance with their allocation sizes. In the memory block, a newly allocated object is disposed therein to be subsequent to a previously allocated object. As the objects are allocated into the memory block in due order, it can be easy to know a returning address before allocating any object to the memory block. The pre-acknowledgement for the data structure size, the requested object size, and the current address makes the last address of the previously allocated object to be easily evaluated. The returning address of the object to be allocated is obtained by summing up the last address of the previously allocated object and the size of the object to be allocated to the last address. The release object pointer indicates "NULL" when the objects are being allocated to the memory block in sequence.

Since the objects are allocated to such a single memory block, it is possible to down the number of invocation for the function malloc( ). In this embodiment of the invention, a further object allocation after consuming one memory block for the prior allocation will refer to the free link list that assigns a new memory block thereto by means of the function malloc( ).

Determining that the requested object size is larger than the threshold at the step S403, it turns to an operation for the object allocation by means of the memory management function malloc( ). That is, in step S409, it scans the free link list to find a node having the same size with the allocation-requested object. The node in the same size with the requested object is then deleted and the requested object is allocated to the position where the node is deleted. In substantial, such an object with a larger size over the threshold is very rarely created, which may be negligible of time consumption for scanning the free link list, and coalescing and splitting the nodes on the larger object.

[Object Release and Free Reuse List]

Figure 6:
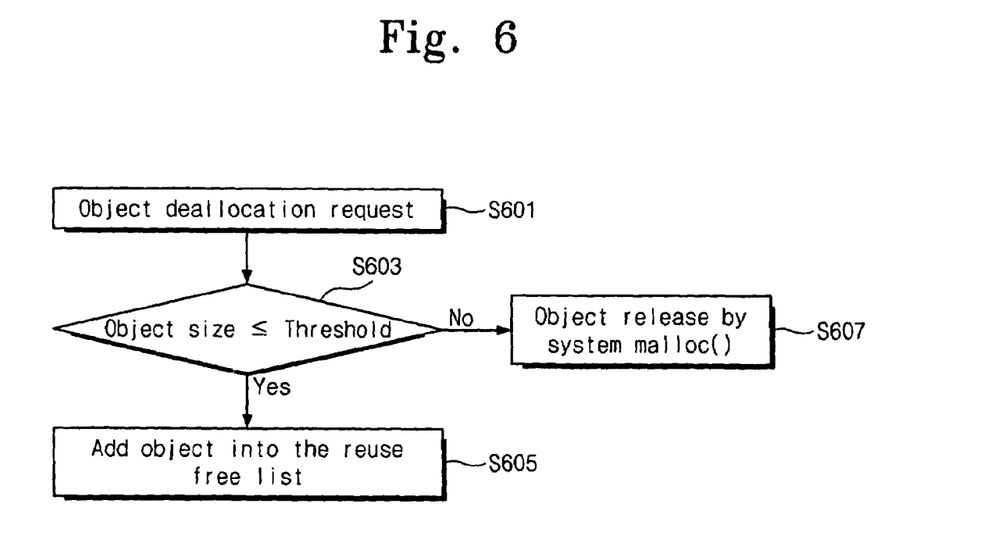
FIG. 6 is a flow chart illustrating a procedure of object release according to the present invention.

FIG. 6 illustrates processing steps for releasing objects according to the present invention. First, in step S601, it requests deallocation for an object that has been allocated to a memory block. Then, a size of the object requested for the deallocation is compared to the threshold at step S603.

If the deallocation-requested object is sized as smaller than the threshold or as same, the object is released from the memory block and added on the free reuse list for reuse. If a size of the deallocation-requested object is larger than the threshold, the object is released under control of the memory management function malloc( ) in step S607.

The free reuse list may be easily formed by utilizing the manner of a pointer-type arrangement. A size of the arrangement in the free reuse list is set up to the threshold and pointers assigned in the arrangement are initialized in the states of "NULL". As the object released from the memory block is added on the free reuse list, a pointer corresponding thereto in the free reuse list indicates the released object. While this, if a released object with the same size previously links to the free reuse list, the released object pointer *next_f corresponding to the currently released object that has been initialized with the NULL state indicates an object released before while a pointer stored in the arrangement indicates the currently released object.

Otherwise, the currently released object may link to the previously released object that is connected to the free reuse list, which means the pointer *next_f corresponding to the previously released object indicates the currently released object.

[Creation of the Free Reuse List]

Figure 7:
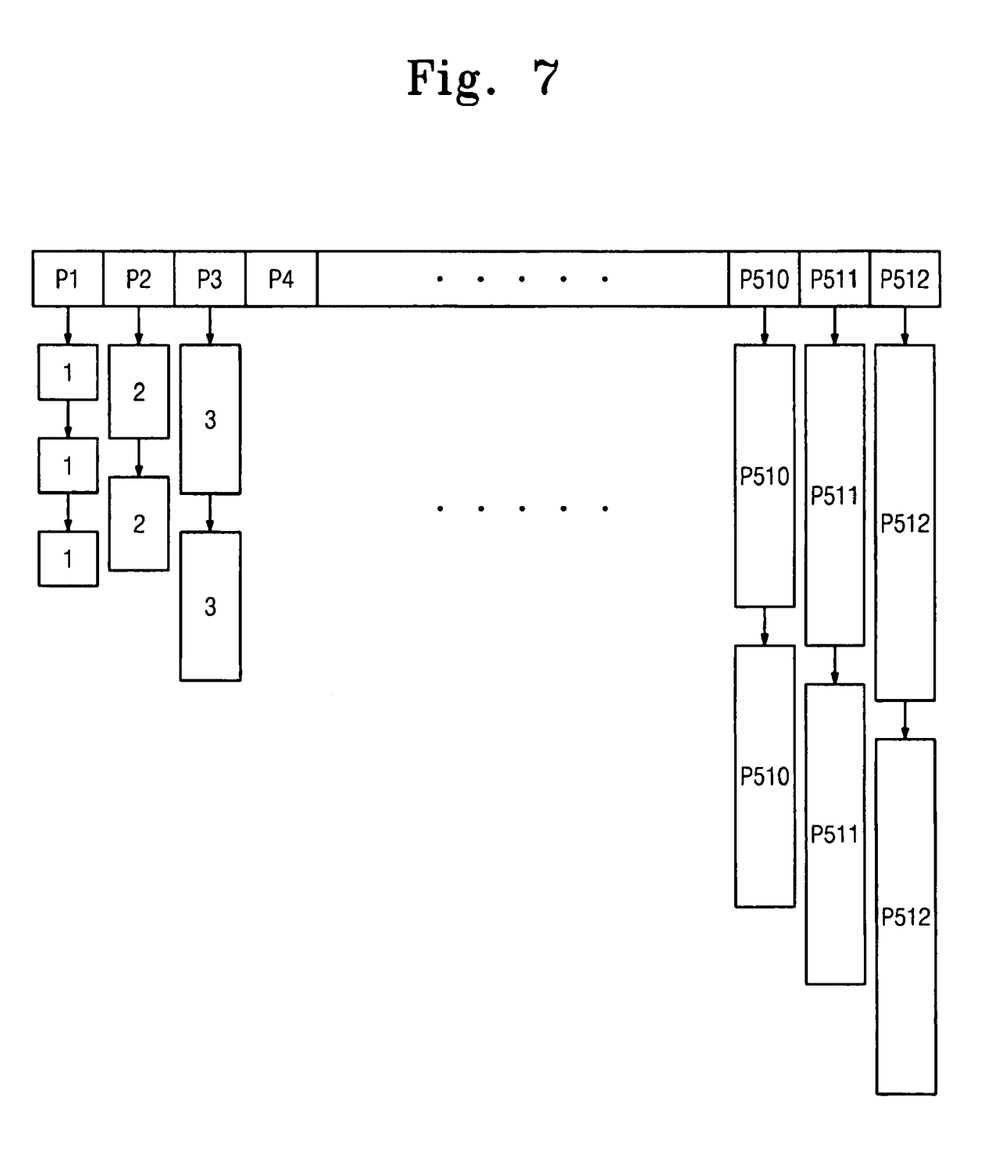
FIG. 7 is a schematic diagram illustrating patterns of a free reuse list according to the present invention.

FIG. 7 illustrates a creation pattern of the free reuse list. Referring to FIG. 7, the released object is added on the list. With adopting the pointer-type arrangement, the free reuse list is rendered to be an indexed list. If an object is released out of the memory block, a pointer stored in an element corresponding thereto in the arrangement indicates the released object. In other words, the released object is linked to the free reuse list. Therefore, it is easy to identify the presence of a reusable object in the list by confirming whether or not the pointer stored in each element of the arrangement is in the NULL state.

As an example, establishing the threshold is 512 bytes as shown in FIG. 7, an arrangement of the free reuse list is composed with elements of 512 NULL-state pointers. If an object with the size of 1 byte is released from the memory block, the NULL-state pointer P1 stored in the first element of the arrangement denotes the released 1-byte object. And, when another one of 1-byte is further released from the memory block, the pointer P1 indicates the currently released object and the released object pointer *next_f indicates the previously released object. With that manner, an object released from the memory block is added on the free reuse list.

The indexed free reuse list is advantageous to adding the released object and to finding the reusable object.

[Object Allocation and Reuse]

Figure 8:
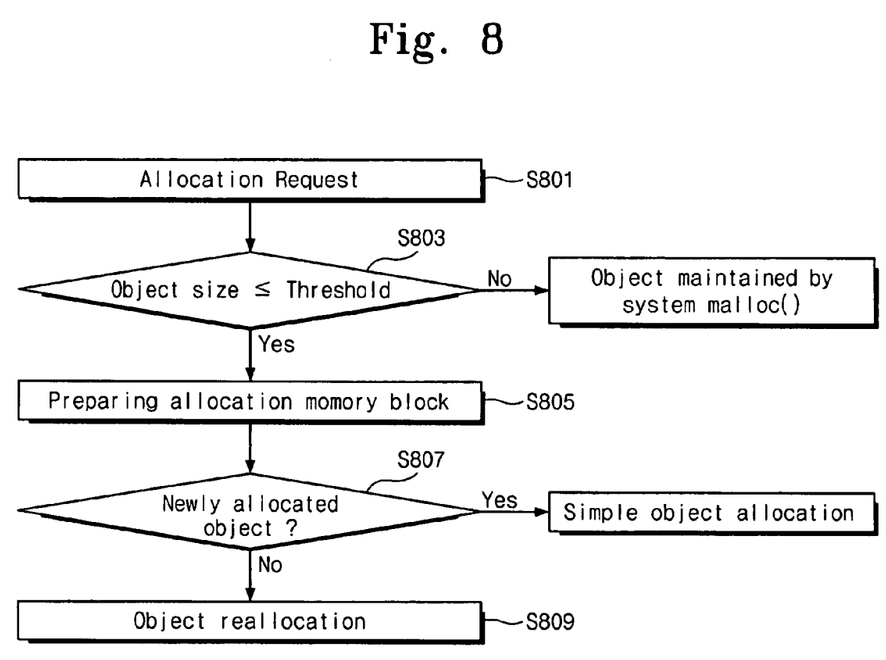
FIG. 8 is a flow chart illustrating a procedure of the object allocation and reuse according to the present invention.

FIG. 8 shows a flow of processing the object allocation and reuse according to the present invention. Referring to FIG. 8, at the beginning of the program (i.e., the object-oriented program), the memory management function malloc( ) assigns a memory to the program by way of an operating system (OS) at step S801. Next, at step S803, the requested object for allocation is compared to the threshold in size. If the size of the requested object for allocation is larger than the threshold, the function malloc( ) offers a memory block with a predetermined capacity (e.g., 8 Kbytes) in step S805.

Then, it is determined whether the requested object is newly allocated or not at step S807, which is the procedure for confirming that a pointer stored in an element of the arrangement corresponding to the requested object is staying in the NULL state. Unless the pointer is the NULL state (i.e., if there is a reusable object), the requested object is allocated to an address of the memory block to which the object returns by an address pointer of the reusable object designated by a pointer stored in the arrangement, in step S809. And the reused object is deleted from the free reuse list.

If it determines there is no reusable object in the step S807, the allocation process is carried out in accordance with the procedure of FIGS. 4 and 5.

Meanwhile, if the size of the requested object for allocation is larger than the threshold at the step S803, the allocation is carried out with reference to the free link list by the memory management function malloc( ).

Based on the foregoing, the system performance is enhanced by employing memory management discriminative in accordance with object sizes. Since small objects that are frequently created and extinct are especially driven into the allocation system with sequential continuity in the memory block, the processing time for object allocation is shortened because the number of invocation for the memory management function malloc( ) is more reduced than the conventional. Moreover, as the indexed free reuse list is provided to reuse the objects released from the memory block, it increases the system managing speed as well as reducing processing overheads in the system.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An apparatus operable with an object oriented program, the apparatus comprising:
    a memory management unit configured to allocate objects to a first memory, and to provide a reuse list to which objects released from the first memory are added,
    wherein an object having a different size from a released object is allocated subsequent to an object on a latest order in the first memory,
    wherein an object of the same size as the released object is allocated to a specific field of the first memory assigned to the released object, and
    wherein the reuse list is formed by an arrangement including elements of null pointers with reference to the object of the same size as the released object.

2. The apparatus according to claim 1, wherein the reuse list stores a pointer of the released object, the pointer indicating an address of a first memory block where the released object is assigned.

3. The apparatus according to claim 1, wherein the memory management unit is further configured to allocate objects to a second memory, the objects assigned to the second memory having a size larger than the objects allocated to the first memory.

4. The apparatus according to claim 3, wherein the second memory comprises a link list.

* * * * *